3,393,623
VIEWFINDER ASSEMBLY FOR PHOTOGRAPHIC CAMERAS
Walter Gutmann and Friedrich Mische, Braunschweig, Germany, assignors to Voigtlander A.G., Braunschweig, Germany, a corporation of Germany
Filed Jan. 24, 1966, Ser. No. 522,599
Claims priority, application Germany, Feb. 3, 1965, V 27,682
5 Claims. (Cl. 95—44)

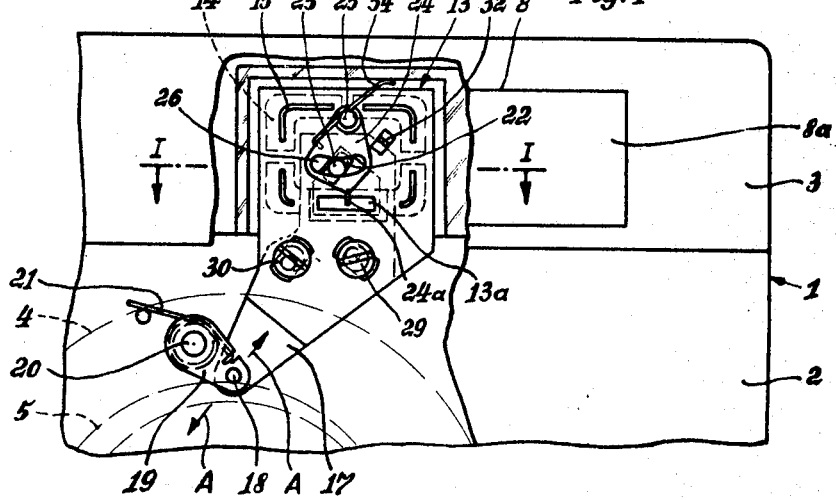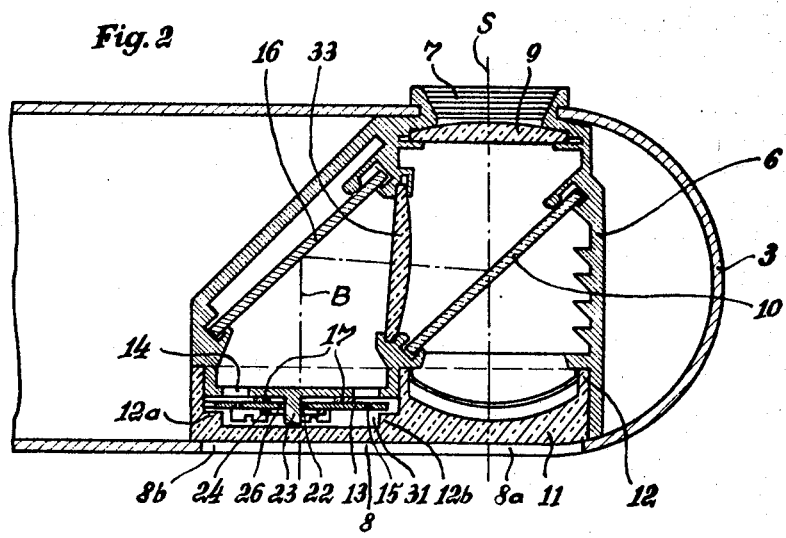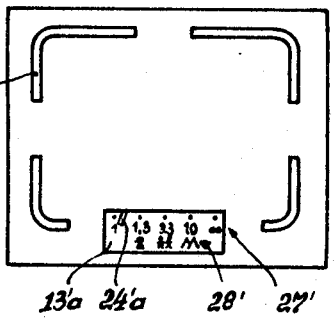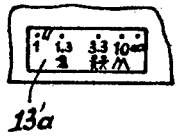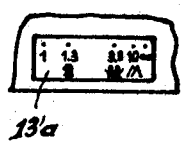

ABSTRACT OF THE DISCLOSURE

A camera viewfinder assembly having a viewfinder system, and an image-field limiting frame which is situated in the region of the viewfinder system. The camera includes an adjustable objective with which a distance-setting device cooperates to adjust the objective according to the distance between the camera and the object to be photographed, and a parallax-correcting device is operatively connected with the image-field limiting frame and the distance-setting device of the camera objective for adjusting the position of the frame in accordance with the distance-setting so as to correct for parallax. An indicating device includes an indicating member and a scale with which it cooperates for indicating the distance-setting of the camera objective. The indicating member is mounted directly on the image-field limiting frame for movement relative thereto, the indicating member and frame respectively are formed with a pair of guide slots which cross each other at a given angle. A stationary guide member in the form of a pin extending through both of the slots, is stationary with respect to the image-field limiting frame and, cooperates with the indicating member to guide the latter for movement so that it will automatically be positioned in response to movement of the image-field limiting frame to indicate, together with the scale, the distance-setting of the camera objective. A device cooperating on the one hand with the viewfinder system and on the other hand with the image-field limiting frame and the indicating device, indicates the distance-setting of the camera objective, for providing in the viewfinder system visible images both of the frame and the distance-setting.

---

The present invention relates to photographic cameras.

More particularly, the present invention relates to viewfinder assemblies for photographic cameras.

In a well known type of viewfinder assembly a means is provided for producing in the viewfinder itself a visible image of an image-field limiting frame as well as an indication of the distance-setting of the camera objective. The image providing the indication of the limits of the image field is conventionally derived from an opaque plate having light-permeable portions the configuration of which determines the configuration of the limiting image seen in the viewfinder, and this opaque plate is generally situated to one side of the viewfinder per se and is exposed to the ambient light so that with suitable optical elements an image of the light passing through the light-permeable portions of the image-field limiting frame will be projected into the viewfinder. Because the objective of the camera is displaced from the viewfinder and the image-field limiting frame is displaced from the viewfinder it is necessary to adjust for parallax, and this adjustment for parallax is carried out in accordance with the distance-setting of the objective and positions the opaque plate which forms the image-field limiting frame so that the image of the latter which is seen in the viewfinder is automatically adjusted to correct for parallax.

The known structures of this latter type are relatively complex and costly. They include a considerable amount of complex motion-transmitting elements which are required to cooperate precisely with each other. In addition, the indication of the distance-setting by way of a visible image in the viewfinder itself is in the form of different small plates of different colors one of which is automatically positioned so that its color can be perceived in the image seen in the viewfinder, and thus the operator by perceiving this color will know the distance-setting of the camera.

It is a primary object of the present invention to provide a structure of the above general type which is far simpler than the conventional structure.

Another object of the present invention is to provide an assembly of the above type which is far more compact than the conventional structure.

In particular, it is an object of the invention to achieve the desired simplicity and compactness of the structure by providing elements each of which performs a plurality of different functions formerly requiring separate elements, respectively.

Furthermore, it is an object of the invention to provide a structure which does not require the operator to remember that a given color signifies a given distance-setting. Instead, it is an object of the invention to provide a structure which will directly indicate to the operator the distance-setting of the camera objective, so that a color-code need not be memorized.

In addition, it is an object of the present invention to provide a structure of the above general type with an adjusting means capable of precisely adjusting the structure so that an accurate indication both of the distance-setting and of the image-field limiting frame will be provided.

Furthermore, it is an object of the invention to provide a structure of the above type which will be free of any play so that in this way also the precision with which the parts operate is enhanced.

The viewfinder assembly of the invention includes not only a viewfinder means, but also an image-field limiting frame which is situated in the region of the viewfinder means and which is exposed to the ambient light. The camera includes an adjustable objective with which a distance-setting means cooperates to adjust the objective according to the distance between the camera and the object to be photographed, and a parallax-correcting means is operatively connected with the image-field limiting frame and the distance-setting means of the camera objective for adjusting the position of the frame in accordance with the distance-setting so as to correct for parallax. An indicating means is provided for indicating the distance-setting of the objective, and this indicating means includes an indicating member and a scale with which is cooperates for indicating the distance-setting of the camera objective. In accordance with the invention, a mounting means mounts the latter indicating member directly on the image-field limiting frame for movement relative thereto, while a stationary guide member, which is stationary with respect to the image-field limiting frame, cooperates with the indicating member of the indicating means to guide the latter for movement so that it will automatically be positioned in response to movement of the image-field limiting frame to indicate together with the scale the distance-setting of the camera objective. Finally, a means cooperates on the one hand with the viewfinder means and on the other hand with the image-field limiting frame and the indicating means, which indicates the distance-setting of the camera objective, for providing in the viewfinder means visible images both of the frame and the distance-setting.

The invention is illustrated by way of example in the accompanying drawings which form part of the application and in which:

FIG. 1 is a fragmentary front elevation of a camera provided with the structure of the present invention, part of the camera housing being omitted so as to more clearly illustrate the structure of the invention situated behind the front wall of the camera housing;

FIG. 2 is a sectional plan view taken along line 2—2 of FIG. 1 in the direction of the arrows;

FIG. 3 is an illustration of the image seen in the viewfinder by the operator of the camera;

FIG. 4 shows a distance scale corresponding to that of FIG. 3; and

FIG. 5 shows another type of distance scale.

Referring now to the drawings, there is shown therein a photographic camera 1 which is provided with a camera housing 2. The housing carries a hollow cap 3 mounted on the upper wall of the housing of the camera to define therewith, in a well known manner, a chamber for receiving various components such as the viewfinder. The camera includes an objective 4 indicated in dotted lines in FIG. 1, and this objective is also provided with a rotary distance-setting means for setting the objective in accordance with the distance between the camera and the object which is to be photographed. This distance-setting means includes a rotary member part of which forms the cam 5 indicated in dotted lines in FIG. 1 and serving a function described below. Thus, when the rotary distance-setting member is turned for setting the objective, the cam 5, which forms part of the distance-setting means, will have an angular position determined by the distance-setting of the objective 4.

Within the cap 3 is situated a viewfinder means which includes the viewfinder housing 6 made of an opaque plastic material. At its rear the viewfinder housing 6 includes a rearwardly extending window 7 extending through an opening of the cap 3 and forming a window through which the operator can look into the viewfinder so as to see an image of the object when viewing along the optical axis S of the viewfinder means. While the rear portion of the cap 3 is formed with an opening through which the window 7 of the viewfinder housing means 6 extends, the front portion of the cap 3 is formed also with an opening 8. It is through this opening 8 in the front wall of the cap 3 that the operator can look in order to see an image of the object which is to be photographed. Situated along the optical axis of the viewfinder is the viewfinder ocular 9 as well as a semi-transparent mirror 10 situated in a plane which makes an angle of 45° with respect to the optical axis of the viewfinder, as is well known. This semi-transparent reflector 10 is capable, on the one hand, of directing to the eye of the operator looking through the window 17 an image received by the rear surface of the reflector 10, while at the same time the operator can view along the optical axis through the reflector 10 in order to receive a clear image of the object which is to be photographed.

As is apparent from FIG. 2, the plastic viewfinder housing 6 is in the form of a molded element which has integrally molded therewith structure for holding the ocular 9 and the reflector 10 properly positioned in the viewfinder housing 6.

The viewfinder means includes a viewfinder objective 11 carried by a light-permeable cap 12 which may take the form of any suitable transparent plastic, for example. This cap 12 which carries the objective 11, as by being integrally formed therewith, is provided with vertically extending guide ribs 12a and 12b situated at the inner surface of the cap 12 to one side of the viewfinder means, as shown most clearly in FIG. 2. It is to be noted that the front surface of the cap 12 completely closes the window 8 formed in the front wall of the cap 3. Furthermore, the viewfinder housing 6 is open at its front end, and the front open end of the viewfinder housing 6 is closed also by the cap 12. Thus, this cap 12 closes not only the front window portion 8a of the viewfinder means but also the front window portion 8b of the structure described below which forms part of the viewfinder assembly of the camera and which is situated beside the viewfinder means.

It is through the window portion 8b and the light-permeable plate 12 that the ambient light reaches the image-field limiting frame which forms part of the assembly of the invention. This frame is in the form of an opaque masking plate 13 situated in front of relatively wide slots 14 formed in the front wall of the viewfinder housing 6 at a portion of the latter housing which is situated to one side of the viewfinder means. These slots 14 conform generally to the configuration of the image-field limiting frame but are of a width which is great enough to guarantee that irrespective of the adjusted position of the image-field limiting frame, which is adjusted to correct for parallax as described below, the light-permeable portions of the image-field limiting frame which determine the configuration of the image-field limiting frame image seen in the viewfinder will be aligned in front of the slots 14.

The opaque masking plate 13 is thus formed with the elongated slots 15 which pass through the plate 13 or which may take the form of suitable strips of light-permeable material, and it is these light-permeable portions 15 of the frame 13 which determine the configuration of the image-field limiting frame image seen in the viewfinder. It is to be noted that the portions 15 of the masking plate 13 have the same general configuration as the slots 14 and are always situated in front of these slots irrespective of the adjusted position of the masking plate 13 which forms the image-field limiting frame.

A means is provided for producing in the viewfinder means a visible image of the image-field limiting frame, and this latter means includes the reflector 16 which directs an image of the light-permeable portions 15 to the rear surface of the mirror 10 at the point where the optical axis S passes therethrough. The molded viewfinder housing 6 also has integrally molded mounting portions which mount and determine the location of the reflector 16. The path along which the light rays move to provide in the viewfinder the image of the image-field limiting frame is indicated at B by a dot-dash line. The operator, when looking into the viewfinder will see the image 15′, indicated in FIG. 3, which is the image indicating to the operator the limits of the field seen through the viewfinder which will be reproduced on the frame of film which is to be exposed.

Inasmuch as the objective 4 is situated below and to the left of the viewfinder, as viewed in FIG. 1, it is necessary to adjust the position of the image-field limiting frame 13 so as to correct for parallax. The parallax correcting means includes a cam-follower arm 17 which is fixed with the masking plate 13 and which carries a pin 18 which engages the camming surface of the rotary cam 5 of the distance-setting means. This pin 18 is also carried by the free end of a lever 19 supported for turning movement by a stationary pivot pin 20 carried by any suitable part of the camera 1. A spring 21 coacts with the lever 19 so as to urge the latter to turn in a clockwise direction, as viewed in FIG. 1, and in this way the cam-follower pin 18 is maintained in engagement with the cam 5. Because of this arrangement of the pin 18 at the end of the lever 19 this pin 18 will move back and forth along a short but substantially straight path, indicated by the arrows A in FIG. 1, in response to turning of the cam 5 when the distance-setting means is actuated to adjust the objective 4.

The plate 13 which forms the image-field limiting frame is formed with an elongated guide slot 22 which extends in a direction substantially parallel to the path of movement of the pin 18, so that the guide slot 22 extends also in the direction of the arrows A. It is to be noted that this is the direction in which the objective is offset with respect to the viewfinder. The front wall portion of the housing 6 of the viewfinder which is formed with the slots 14 integrally carries a guide pin 23 which together with the slot 22 forms a guide means to guide the plate 13 for movement in the direction of the arrows A, and of course the guide pin 23 extends forwardly through the slot 22 so that in this way the plate 13 will be guided for movement in the directions indicated by the arrows A when the distance-setting means is actuated. In this way an automatic parallax correction for the particular distance-setting of the objective is provided, so that the position of the image 15' shown in FIG. 3 is always accurately determined in a manner free of any parallax errors.

The assembly of the invention further includes an indicating means for indicating to the operator of the camera the distance-setting of the camera objective. This indicating means includes an indicating member 24 which in accordance with the present invention is mounted directly on the frame 13 for movement relative thereto by a mounting means which in the illustrated example takes the form of a pivot pin 25 fixed to and extending forwardly from the plate 13 through an upper end of the indicating member 24 so as to support the latter for pivotal movement relative to the plate 13 with which the indicating member 24 is of course constrained to move when the plate 13 is adjusted for parallax correction. In this way the plate 13 functions not only as an image-field limiting frame but also as a support for the indicating member 24 of the distance-setting indicating means. This latter means further includes a scale formed by a light-permeable portion 13a of the plate 13. This light-permeable portion of the plate 13 may be in the form of a transparent member mounted in a suitable opening of the opaque plate 13 so as to be fixedly carried thereby, for example. The transparent portion 13a carries a scale of distances, and the indicating member 24 has a pointer portion 24a cooperating with the scale indicia carried by the transparent portion 13a of the plate 13.

In accordance with a further feature of the invention the indicating member 24 is formed with a suitably curved guide slot 26 which extends across the guide slot 22 at a given angle and which also receives the guide pin 23 which is integrally fixed with the front wall portion of the viewfinder housing 6, so that the guide member 23 is stationary with respect to the image-field limiting frame 13. Since the indicating member 24 moves with the plate 13 in response to parallax correction when the distance-setting of the objective is changed, the curvature of the slot 26 in cooperation with the stationary guide pin 23 and the pivotal mounting of the indicating member 24 and the pin 25 provides for the indicating member 24 an angular position determined by the distance-setting of the objective, and this distance-setting is indicated by the position of the pointer portion 24a along the scale carried by the plate 13a. Thus, whenever the plate 13 is moved in the direction of the arrows A the pin 25 will move with respect to the stationary pin 23 so that the indicating member 24 will assume an angular position determined by the curvature of the slot 26 and the extent of movement of the plate 13, and in this way the indicating means will indicate the distance set into the objective 4 by the operator.

The means which provides in the viewfinder a visible image of the image-field limiting frame also provides in the viewfinder a visible image of the distance-setting indicated by the indicating means, and thus the same reflector 16 which reflects an image of the light-permeable portions 15 into the viewfinder reflects also an image of the scale carried by the plate 13a and the pointer 24a into the viewfinder so as to be visible therein. The distance-setting image seen in the viewfinder is shown in FIG. 3 where the image 13'a of the scale and the image 24'a of the pointer are indicated.

In accordance with a further feature of the invention, the scale carried by the plate 13a includes numerical graduations 27' and non-numerical, symbolic graduations 28'. These are indicated in FIG. 3 where their images are shown. Thus, while the numerical graduations 27' will indicate specific distances, the symbolic graduations 28' will be symbolic of a portrait, group, or landscape, so as to indicate successively greater distances between the object to be photographed and the camera. Thus, when the operator of the camera looks into the viewfinder not only will the operator see an image of the object to be photographed, but in addition the operator will see the limits 15' of the field which will be reproduced on the film frame and will have an indication of the distance at which the objective is set.

The conventional distance scales carried by the objective mounting of a conventional camera are not linear. In the event that the distance scale whose image is provided in the viewfinder is correspondingly non-linear, then the numerical or symbolic series of graduations will have an arrangement as shown in FIG. 5. However, because of the relatively small amount of space which is available within the viewfinder to accommodate such a scale, it may be difficult to read in the viewfinder an image of a scale whose graduations have a non-linear position relative to each other corresponding to the non-linearity of the distance scale of the objective itself. It is preferable, therefore, to provide in the viewfinder a series of distance graduations, either numerical or symbolic or both, which are linearly arranged at least to an extent greater than that indicated in FIG. 5, and such an arrangement is indicated in FIG. 4 where the linear relationship of the graduations relative to each other is substantially the same as that which is included in the scale shown in FIG. 3. With this arrangement it is of course necessary to compensate in the movement of the pointer 24a so that it will cooperate properly with the linearly spaced graduations although actuated from a non-linear source. This requires only that the cam 5 and/or the curvature of the guide slot 26 be so arranged that the camming of the indicating member 24 either by way of the slot 26 in cooperation with the pin 23 or indirectly from the plate 13 through the cam 5 and cam follower 18 take into account the linear movement of the pointer 24a in response to non-linear graduations in the scale used to set the objective. Thus, the movement of the pointer 24a in this case will not be proportional to the turning of the distance-setting means which includes the cam 5.

In order to be able to adjust the image-field limiting frame 13 relative to the viewfinder, on the one hand, and the indicating member 24 relative to the light-permeable portion 13a, on the other hand, the cam-follower arm 17 and the masking plate 13 are adjustably connected to each other, by the adjusting means 32, for longitudinal and turning movement one relative to the other. This connection 32 which provides relative movement between the follower arm 17 and the plate 13 takes the form of the equivalent of a pin-and-slot connection. Thus, as is shown in FIG. 1, the plate 13 is provided with an elongated slot extending in the direction of the slot 22 and receiving a lug which is integral with and projects forwardly from the upper right corner of the arm 17, as viewed in FIG. 1.

The adjustment of these elements relative to each other is carried out by way of a pair of rotary screws 29 and 30 threadedly carried by the arm 17 and extending through elongated slots formed in the plate 13. The opposed side edges of these slots are slidably engaged by circular eccentric portions of the adjusting screws 29 and 30. These circular eccentric portions of the screws are displaced from the axes of the screws so that when they are turned the eccentric portions will cooperate with the plate 13 to shift it with respect to the arm 17. Since the slot which receives the screw 30 extends in the direction of the slot 22, it is clear that turning of the screw 30 will adjust the plate 13 and arm 17 one relative to the other in a direction transversely to the direction of the slot 22. On the other hand, the slot which receives the screw 29 extends perpendicularly to the slot 22 and therefore turning of the screw 29 will result in adjustment of elements 13 and 17 one relative to the other in the direction of the slot 22. The extent of adjustment of the elements 13 and 17 relative to each other will in general be to only a relatively small degree, so that the screws 29 and 30 can also serve for interconnecting elements 17 and 13 with respect to each other.

Because the indicating member 24 is mounted directly on the plate 13 by the mounting means 25, it is clear that the transverse adjustment derived from the screw 30 will also result in adjusting of the pointer 24a with respect to the scale carried by the light-permeable portion 13a of the plate 13. In fact the screw 30 will serve primarily to adjust the pointer and scale of the indicating means relative to each other while the screw 29 will serve primarily to adjust the image-field limiting frame.

As is apparent from FIG. 2, the masking plate 13 which forms the image-field limiting frame is situated, together with the parts connected thereto, in a protected chamber 31 between the transparent cap 12 and a front wall portion of the housing 6, and of course the vertically extending projections or ribs 12a and 12b of the cap 12 slidably engage the opposed side edges of the plate 13 to guide the latter for movement in the path determined by the stationary guide pin 23 and the inclined slot 22.

The adjusting means referred to above will of course greatly enhance the precision with which the structure operates. This precision is further enhanced by a play-eliminating structure which includes the torsion spring 34 coiled in part around the pivot pin 25 and having a pair of free ends one of which engages a side edge of indicating member 24 so as to urge the latter to turn in a counterclockwise direction about the pin 25, as viewed in FIG. 1, and the other of which engages the upper inner peripheral portion of the cap 12. As a result of this latter engagement of the spring 34 with the cap 12 the pivot pin 25 together with the masking plate 13 to which it is rigidly fixed are pressed downwardly, as viewed in FIG. 1. This spring 34 therefore guarantees that there will be no play on the one hand between the guide pin 23 and the curved camming slot 26 which cooperates with the guide pin 23 to determine the angular position of the indicating member 24 and on the other hand that there will be no play between the cam follower pin 18 and the opening in the arm 17 which receives the pin 18. Thus, the pin 18 is fixed to the free end of the lever 19 and extends through and opening of the arm 17 without any play as a result of the action of the spring 34. This elimination of play is significant for the accuracy and dependability of the information given by the images seen in the viewfinder.

Of course, the invention is not necessarily limited to the details described above and shown in the drawings. In particular, the transmission from the distance setting structure of the objective to the image-field limiting frame 13 can be carried out through other structure and in a different manner. Moreover, the direction indicated by the arrows A depends only in the direction in which the viewfinder and the objective are offset with respect to each other. Therefore, where there is a different positional relationship between the objective and viewfinder, this direction A will be correspondingly different. Furthermore, the indication of the distance-setting provided in the viewfinder can be derived by way of other symbols. In particular, it is possible to provide only a scale of numerical indicia or a scale of non-numerical symbolic indicia.

As is indicated in FIG. 2, the means which provides in the viewfinder the visible images of the image-field limiting frame and the distance-setting can include, in addition to the reflector 16 and the semi-transparent mirror 10, the intermediate lens 33.

It is to be noted that with the structure of the invention the indicating means which indicates the distance-setting is situated in its entirety in the region of the masking plate 13 which forms the image-field limiting frame. It is the movement of this latter frame which is used directly for indicating the distance, so that a special transmission for transmitting motion from the distance-setting structure of the objective to the distance indicating means is not required beyond the masking plate itself. Thus, an extremely compact simple structure can be achieved with the invention.

Further simplification and compactness is achieved by providing the single pin 23 which participates in the guiding of the plate 13 as well as the indicating member 24. Since this single guide pin 23 performs these two functions, additional compactness and simplicity is achieved. Of course, this latter result is also brought about by way of the intersecting guide slots which receive the single guide pin 23.

Because the operator will see, directly, numerical distance indicia or non-numerical symbolic indicia indicating distance, it is unnecessary for the operator to recall that a certain color means a certain distance.

Of course, all of the details described above and shown in the drawings can be used not only in the disclosed combinations but also in other combinations.

What is claimed is:

1. For use in a photographic camera, a viewfinder assembly comprising viewfinder means for viewing the object which is to be photographed including a viewfinder housing, an image-field limiting frame situated in the region of said viewfinder means, an objective having a distance-setting means for setting the objective according to the distance between the camera and the object to be photographed, parallax-correcting means operatively connected with said image-field limiting frame and said distance-setting means for adjusting the position of said frame relative to said viewfinder means to correct for parallax in accordance with the distance set by said distance-setting means, indicating means for indicating the setting of said distance-setting means, said indicating means including an indicating member and a scale with which said indicating member cooperates, mounting means mounting said indicating member on said image-field limiting frame for movement relative thereto, said indicating member and frame respectively being formed with a pair of guide slots which cross each other at a given angle, guide means guiding said indicating member for movement relative to said frame in response to adjustment of the latter for correction of parallax for positioning said indicating member relative to said scale so as to indicate the setting of said distance-setting means, said guide means including a guide member which remains stationary with respect to said frame, said guide member being in the form of a pin, fixed to said housing and extending through both of said slots said guide member at least partly participating in the guiding of said frame during adjustment thereof for correction of parallax, and means cooperating with said indicating means, said frame, and said viewfinder means for providing in said viewfinder means a visible image of said image-field limiting frame and said indicating means, so that when the operator views the object to be photographed with said viewfinder means the operator will also see an image of said frame and said indicating means indicating the distance at which the objective is set by said distance-setting means.

2. An assembly as recited in claim 1 and wherein said pin is integral with said housing.

3. For use in a photographic camera, a viewfinder assembly comprising viewfinder means for viewing the object which is to be photographed including a viewfinder housing, an image-field limiting frame situated in the region of said viewfinder means, an objective having a distance-setting means for setting the objective according to the distance between the camera and the object to be photographed, parallax-correcting means operatively connected with said image-field limiting frame and said distance-setting means for adjusting the position of said frame relative to said viewfinder means to correct for parallax in accordance with the distance set by said distance-setting means, indicating means for indicating the setting of said distance-setting means, said indicating means including an indicating member and a scale with which said indicating member cooperates, mounting means mounting said indicating member on said image-field limiting frame for movement relative thereto, guide means guiding said indicating member for movement relative to said frame in response to adjustment of the latter for correction of parallax for positioning said indicating member relative to said scale so as to indicate the setting of said distance-setting means, said guide means including a guide member which remains stationary with respect to said frame, a spring means engaging said indicating member and said housing for acting on said indicating member to urge the latter to move with respect to said frame in a given direction and to act on said housing for urging said indicating member together with said frame also in a given direction, and means cooperating with said indicating means, said frame, and said viewfinder means for providing in said viewfinder means a visible image of said image-field limiting frame and said indicating means, so that when the operator views the object to be photographed with said viewfinder means the operator will also see an image of said frame and said indicating means indicating the distance at which the objective is set by said distance-setting means.

4. For use in a photographic camera, a viewfinder assembly comprising viewfinder means for viewing the object which is to be photographed including a viewfinder housing having an open front end, a viewfinder objective situated at said front end of said housing, and a light-permeable cap carrying said viewfinder objective, an image-field limiting frame situated in the region of said viewfinder means, an objective having a distance-setting means for setting the objective according to the distance between the camera and the object to be photographed, parallax-correcting means operatively connected with said image-field limiting frame and said distance-setting means for adjusting the position of said frame relative to said viewfinder means to correct for parallax in accordance with the distance set by said distance-setting means, said cap closing said front end of said housing, being situated in front of said frame so that the latter receives light through said cap, and guiding said frame for movement by said parallax-correcting means indicating means for indicating the setting of said distance-setting means, said indicating means including an indicating member and a scale with which said indicating member cooperates, mounting means mounting said indicating member on said image-field limiting frame for movement relative thereto, guide means guiding said indicating member for movement relative to said frame in response to adjustment of the latter for correction of parallax for positioning said indicating member relative to said scale so as to indicate the setting of said distance-setting means, said guide means including member which remains stationary with respect to said frame, and means cooperating with said indicating means, said frame, and said viewfinder means for providing in said viewfinder means a visible image of said image-field limiting frame and said indicating means, so that when the operator views the object to be photographed with said viewfinder means the operator will also see an image of said frame and said indicating means indicating the distance at which the objective is set by said distance-setting means.

5. For use in a photographic camera, a viewfinder assembly comprising viewfinder means for providing an image of the object which is to be photographed, said viewfinder means including a viewfinder housing having a front wall portion formed with slots passing therethrough and situated to one side of the optical axis of said viewfinder means, said slots having the arrangement of an image-field limiting frame but being wider than the largest possible variation in the position of an image-field limiting frame in order to correct for parallax, said portion of said housing which is formed with said slots also integrally carrying a forwardly directed guide pin which extends substantially parallel to the optical axis of the viewfinder means, an image-field limiting frame situated in front of said portion of said housing and being in the form of a plate whch is opaque and which is formed with slots conforming generally to the configuration of said slots of said viewfinder housing and respectively aligned in front of said housing slots but being sufficiently narrower than the latter to be always situated in front of said housing slots irrespective of the adjusted position which said plate assumes for parallax correction, a camera objective having a given position relative to said viewfinder means, said plate which forms said frame being formed with an elongated guide slot receiving said pin and extending in the direction in which said camera objective is offset with respect to said viewfinder means so that said guide slot of said plate cooperates with said pin to guide said plate for movement during parallax correction, distance-setting means operatively connected with the camera objective for setting the latter and including a rotary cam having angular positions determined by the distance at which said objective is set, cam follower means engaging said cam and operatively connected with said plate for adjusting the latter for parallax in accordance with the distance-setting of the camera objective, said plate which forms said image-field limiting frame having a light-permeable portion carrying a distance-setting scale, and said plate also fixedly carrying a pivot pin, and an indicating pointer turnably carried by said pivot pin and having a free indicating end movable along said scale, said pointer being formed with a guide slot receiving said guide pin and having a curvature which in response to movement of said frame cooperates with said guide pin to position said pointer with respect to said scale indicating the distance, said guide slot of said pointer and said guide slot of said frame crossing each other where said guide pin extends therethrough, and means providing in said viewfinder means a visible image of said pointer and scale as well as of said image-field limiting frame.

References Cited

UNITED STATES PATENTS 2,346,076  4/1944  Mihalyi _____ 95—44
2,981,166  4/1961  Madge _____ 95—44

NORTON ANSHER, *Primary Examiner.*

GARY M. HOFFMAN, *Assistant Examiner.*